United States Patent [19]

van Capelleveen

[11] 4,244,464

[45] Jan. 13, 1981

[54] CONVEYOR, IN PARTICULAR FOR EGGS

[75] Inventor: Pieter van Capelleveen, Ziest, Netherlands

[73] Assignee: Gebr. van Capelleveen B.V., Utrecht, Netherlands

[21] Appl. No.: 100,343

[22] Filed: Dec. 5, 1979

[51] Int. Cl.³ ............... B65G 17/06; B65G 13/02
[52] U.S. Cl. ............... 198/688; 198/850; 198/848; 198/831
[58] Field of Search ............ 198/850, 848, 849, 853, 198/459, 831, 688, 698; 209/912, 922

[56] References Cited

U.S. PATENT DOCUMENTS 2,800,218 7/1957 Drouin ............... 198/831
3,061,077 10/1962 Noffsinger ............... 198/688

*Primary Examiner*—Robert B. Reeves
*Assistant Examiner*—Brian Bond
*Attorney, Agent, or Firm*—Cushman, Darby & Cushman

[57] ABSTRACT

A conveyor, in particular for eggs, comprising two lateral chains of the type having closed annular links extending in perpendicular planes. The chains are interconnected by a number of transverse bars forming the actual carrier surface. Successive bars have different levels upon a common reference plane, so that at least the upper surface of each second bar is on a higher level than the upper surface of the first bar. One advantage is that eggs resting on two bars can be transported over steeper rises without rolling backwards.

5 Claims, 16 Drawing Figures

CONVEYOR, IN PARTICULAR FOR EGGS

FIELD OF THE INVENTION

This invention relates to a conveyor, in particular for eggs.

BACKGROUND OF THE INVENTION

A conveyor comprising a coneyor belt composed of transverse bars of spring steel or like material, extending transversely to the conveyor belt and having their ends secured to a chain of the type having closed annular links extending in perpendicular planes, which links permit temporary shortening of the chain for traversing bends through sliding one into the other, is described in French Pat. No. 2,162,150.

If such a conveyor is used for the transportation of eggs, the pitch of the bar belt, that is to say, the centre-to-centre distance of successive bars, measured in the longitudinal direction of the belt, is preferably elected so that an egg will automatically orient itself with its longitudinal axis in the direction of the bars, i.e., transverse to the direction of transportation, to rest on two bars in a stable manner. In the prior belt, in which all bars are located at the same level, and consequently their upper surfaces define a substantially flat plane of transportation, each egg is supported at two places located within the projection of the egg on the plane of transportation, that is to say, viewed in the longitudinal direction of the belt, each egg projects outside the two bars supporting it.

It is thus prevented that, in the longitudinal direction of the belt, two eggs come to lie directly one after the other, resting on three successive bars. There is always an interspace between two eggs that lie in alignment on the belt, the interspace being at least one gap between two bars. It is important that nowhere in the path of transportation is the maximum permissible slope exceeded. For if the slope becomes too steep, an egg may start to roll over the trailing bar, i.e. the rear one of the two bars supporting the egg, and strike a next egg, thereby causing fracture.

SUMMARY OF THE INVENTION

It is an object of the present invention to increase the maximum slope of transport. This object is achieved in accordance with the present invention by placing the successive bars in the belt at different levels relative to the plane of transportation. In a structurally simple manner, this is realized by an effective choice of how to secure a bar to the chain links. When the chains are guided so that the links are oriented alternately with their main plane in the vertical position and with their main plane in the horizontal position, or in other words so that there is a succession of vertical and horizontal links, successive bars are secured, in accordance with the present invention, on top of the vertical links and laterally to the horizontal links, for example, by welding. It is also possible for the bars to be welded to the side of the vertical links and to the top of the horizontal links. In the first case there is a large difference in level between successive bars, and in the second case there is a small difference. An intermediate value can be obtained by welding all bars either to the tops or to the sides of the links.

The effect of differences in height between successive bars in the belt is that in a sloping part of the path of travel, as soon as a certain angle of slope, which depends on the centre-to-centre distance of the bars and the size of the eggs, is exceeded, the eggs initially supported on a higher leading and a lower trailing bar will begin to roll over the lower bar to their most stable position in this part of their path of travel, i.e. the position in which they rest on a lower leading bar and a higher trailing bar.

When eggs which have thus found their most stable position traverse a sloping part of their path of travel, they will only begin to roll off the slope, if the angle of inclination has exceeded the value $(\alpha + \beta)$, in which $\alpha$ is the angle of inclination at which the eggs would have started to roll if all the bars in the belt had the same height, and $\beta$ is the angle indicating the difference in level between two successive bars.

In the bar belt according to the invention, the "spacing", longitudinally of the belt, of eggs transported one behind the other is caused not only by the proper centre-to-centre distance of the bars, but the spacing is also ensured by the difference in level of the successive bars. This is of great importance when a number of eggs traverse an inner bend one behind the other, because it is then absolutely avoided that eggs transported in a single file cause damage to one another.

In a further elaboration of the invention, the chains of the conveyor run in a guiding chute, and there are provided driven sprockets in engagement with the links. In this way, relatively high driving forces can be exercised, and consequently large chain lengths can be used. This is a great advantage especially in the transportation of eggs, for the use of short conveyor belts means that the eggs must often be transferred to another belt, with the increased risk of breakage.

The bar belt of the conveyor according to the present invention is structurally simple, strong, capable of taking up substantial driving forces, and capable of transporting eggs over relatively large angles of inclination.

BRIEF DESCRIPTION OF THE DRAWINGS

FIGS. 5a–8a show various possibilities of securing bars to chains;

FIGS. 5b–8b show differences in level between successive bars in the embodiments of FIGS. 5a–8a;

DESCRIPTION OF PREFERRED EMBODIMENTS

Referring to the accompanying drawings, a bar belt according to the present invention comprises two side chains 1 and 2, each composed of vertical links 3 and horizontal links 4. The links of chains 1 and 2 are interconnected pair-wise by bars 5, the ends of which are connected, for example by welding, to the respective chain links.

Figure 1:
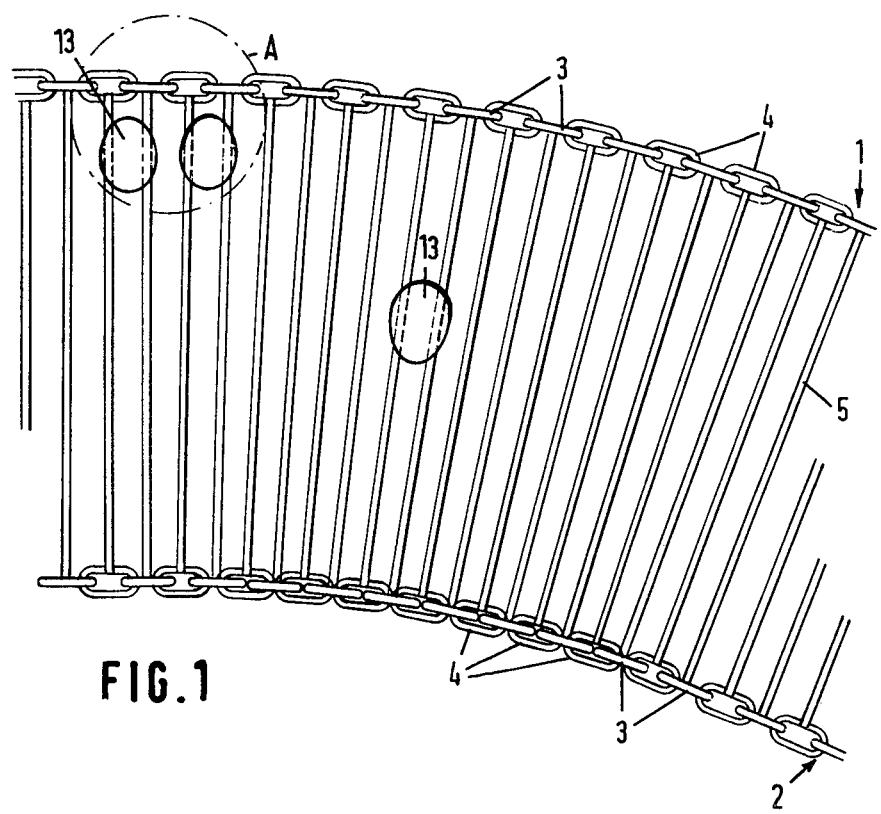
FIG. 1 is a plan view of a portion of a bar belt according to the present invention.
Figures 10, 10A:
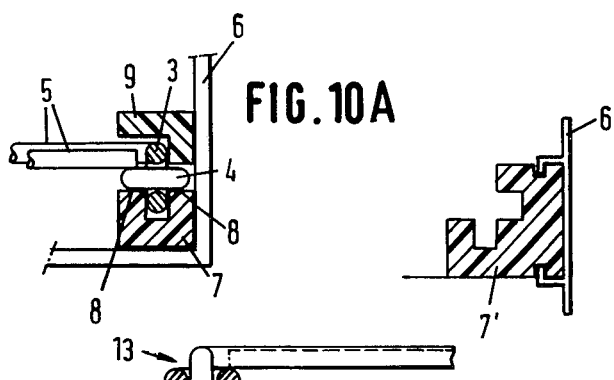
FIG. 10 is a cross-sectional view, showing a detail of the belt guiding system, in particular for bends.
FIG. 10a shows a variant of the belt guiding system.

FIG. 1 shows the manner in which, in traversing a bend, the chain links 3 and 4 slide one into the other in the inner bend. FIG. 10 shows a detail of a carrying frame 6 for a guide chute 7, in which the bottom part of the vertical links 3 can be accommodated, with the horizontal links 4 sliding over the upper edges 8 of chute 7. If desired, a cover section 9 may be used to prevent chains 1, 2 from being lifted from their chute 7.

Figure 11:
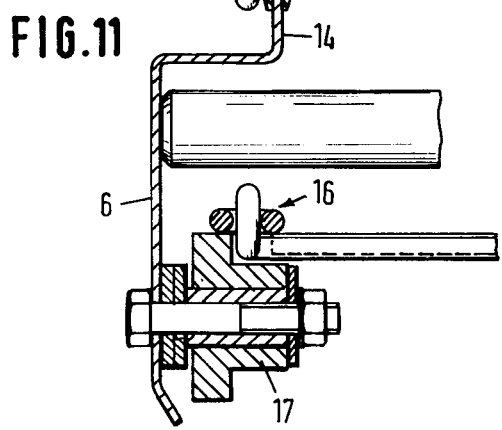
FIG. 11 shows a belt guiding system, in particular for straight paths.

The use of such guide sections, a variant of which is shown in FIG. 10a, may generally be limited to bends. In the straight portions, a simple guide may be used as shown, for example, in FIG. 11, in which the carrying conveyor run 13 can slide continuously over a frame edge 14 with a wear-resistant sliding coating 15, the return run 16 being guided over freely rotating rollers 17 journallled in frame 6.

Figure 9:
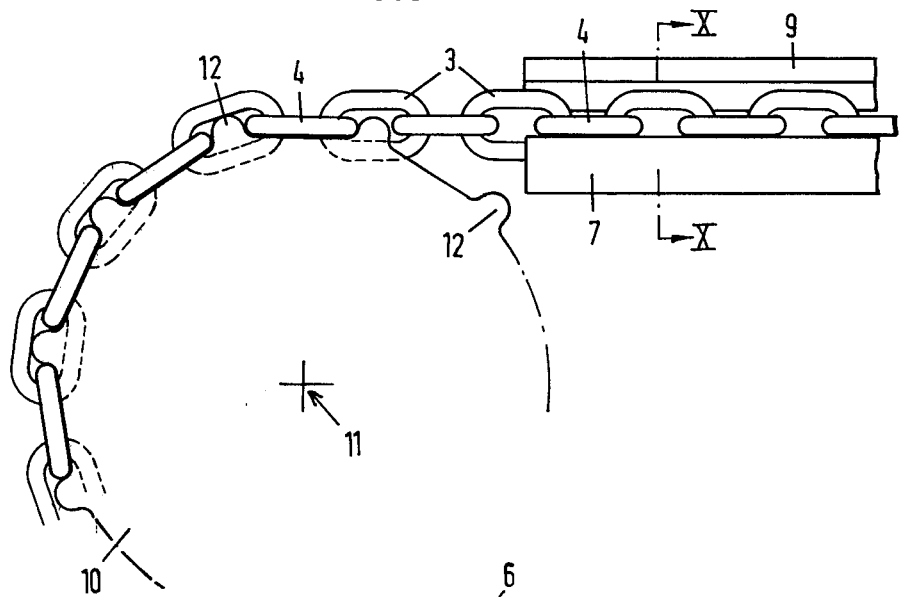
FIG. 9 is a diagrammatic view showing the drive of the bar belt.

The belt can be driven using sprockets 10, one of which is shown in FIG. 9. Such sprockets may be mounted in pairs on a shaft 11 and driven by a motor (not shown), engaging with peripherally spaced teeth 12 with the horizontal links 4 of chains 1 and 2.

Figure 2:
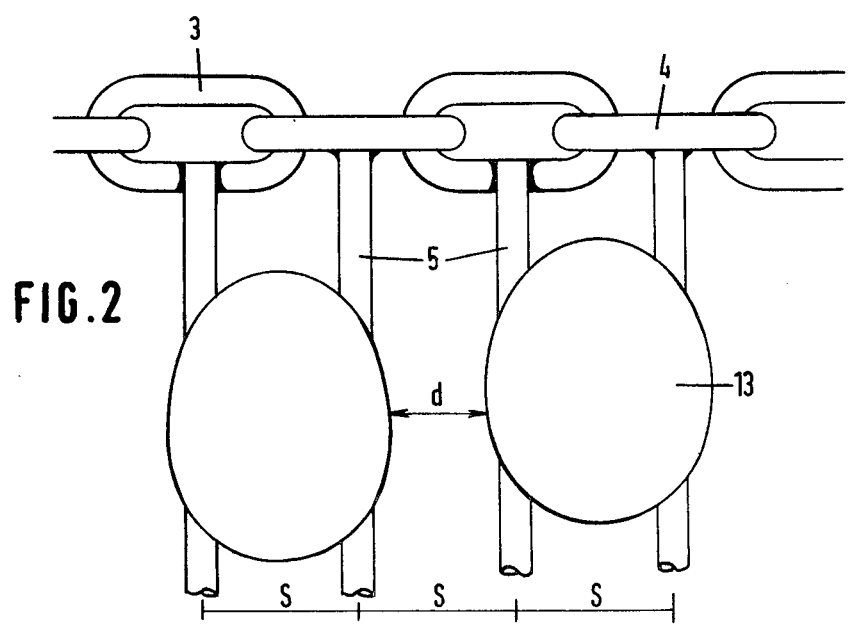
FIG. 2 is a plan view, showing the part A of the belt, encircled in FIG. 1.

As shown in FIG. 2, eggs 13 rest on the bars 5, whose centre-to-centre distance or pitch s has been selected so that each egg is carried by two successive bars 5. The chains are perfectly stretched in the straight portions of the path of travel of the belt, and in the outer bend of a curved portion chain 1 is perfectly stretched, and the links of chain 2 in the inner bend are slid one into the other, whereby the centre-to-centre distance of the array of bars 5 there becomes less than s. In the bends however, the bars 5 diverge gradually from the inner bend chain to the outer bend chain to reach the point of maximum divergence, so that eggs 13, which will tend to move in the direction of a wider supporting zone between the two bars on which they rest, if they come to move at all, will do this very gradually and slowly.

FIG. 2 shows eggs approximately in alignment with each other in the longitudinal direction of the bar belt. Although egg sizes may differ, variation in practice is limited, so that pitch s may always be so selected (illustrated true to size in FIG. 2) that the bar belt conveyor can be used for all current egg sizes. As shown in FIG. 2, it is impossible that eggs lying one behind the other are supported on three successive bars 5 only. There will always be a vacant carrying zone defined by two successive bars, and the eggs will remain spaced a distance d from each other.

Figure 3:
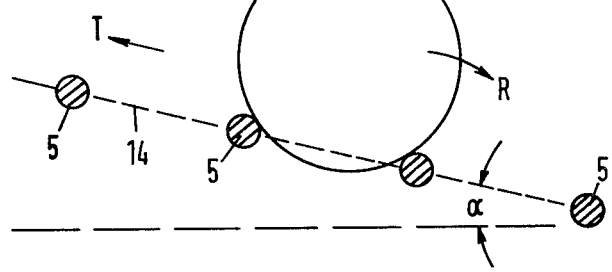
FIGS. 3 and 4 show the position of an egg on two bar belts of different constructions.

In FIG. 3, bars 5 are shown lying all in the same flat plane of transportation 14. If now, in a given portion of the path of transport, the plane of transport 14 is inclined relative to the horizontal plane, then, with a given pitch s and a given egg size, there will be an angle of inclination $\alpha$ which, if exceeded, is likely to cause the eggs to start rolling on the belt. For example, with a direction of transportation F, eggs may start rolling in the direction R, which of course must be prevented.

Figure 4:
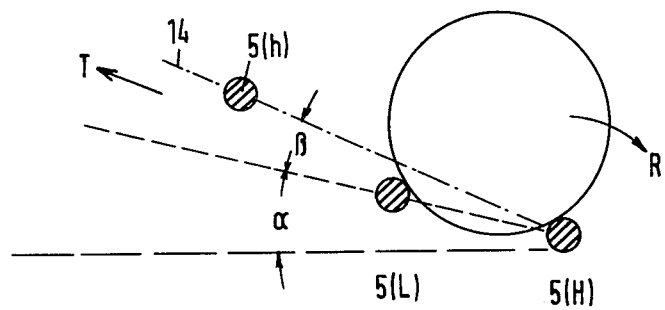

FIG. 4 shows the manner in which, by a specific choice of the bar belt configuration, the maximum permissible angle of inclination of the path of transport can be increased. In it, bars 5 are in fact not all located in the plane of transport 14, but alternately within the plane of transport and below (or above) it. The eggs will automatically find the most stable position and, in the situation shown in FIG. 4, come to rest on a relatively low bar L, leading in the direction of transport T, and a relatively high bar H, trailing in the direction of transport T. If plane 15 containing bars L and H encloses the maximum permissible angle of inclination $\alpha$ with the horizontal, the plane of transportation 14 slopes relative to plane 15 at an angle $\beta$, so that the maximum angle of the belt is not $\alpha$ but $(\alpha+\beta)$. The angle of inclination may accordingly be greater by an angle $\beta$ than with co-planar bars 5 before eggs begin to roll.

The size of angle $\beta$ is determined by the difference in level between successive bars 5 (L) and 5 (H), and FIGS. 5a–8b show the manner in which angle $\beta$ can be varied.

Figure 5A:
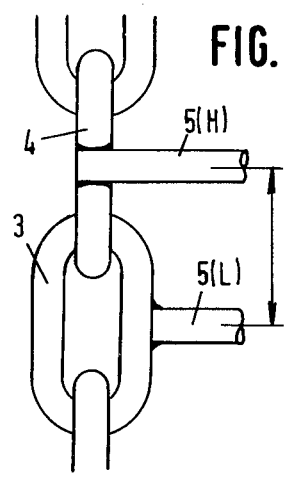
Figure 5B:
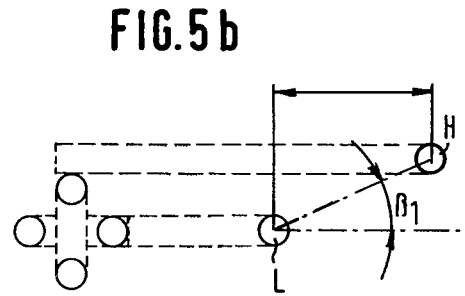

In FIG. 5a, bar 5 (H) is welded to the top of vertical link 4, and bar 5 (L) to the side of horizontal link 3. As shown in FIG. 5b, this results in a given value for angle $\beta$, namely, $\beta_1$.

Figure 8A:
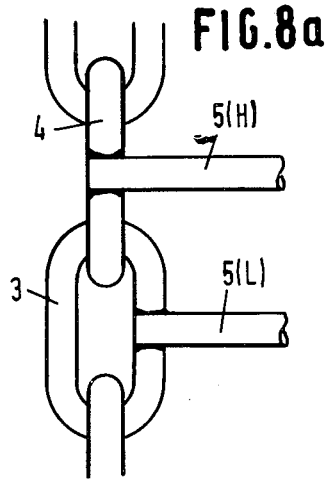
Figure 8B:
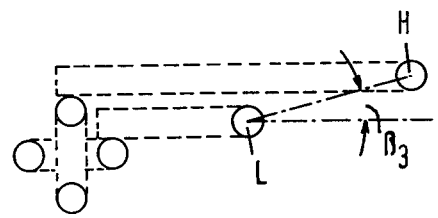
Figure 6A:
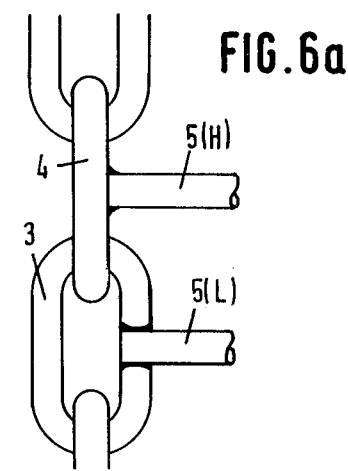
Figure 6B:
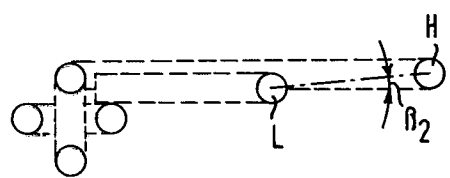
Figure 7A:
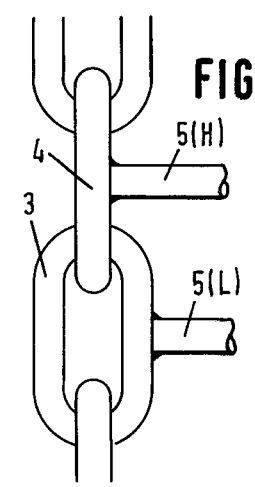
Figure 7B:
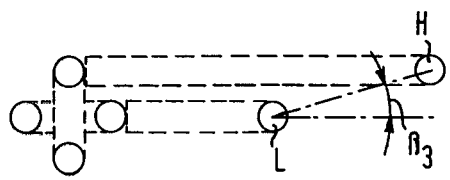

By welding the high bar 5 (H) to the side of vertical link 4 and low bar 5 (L) to the top of the horizontal link 3, as shown in FIG. 6a, the angle $\beta$ is reduced to $\beta_2$. An intermediate angle value $\beta_3$ is reached by fixing the high bar 5 (H) and the low bar 5 (L) to the respective bars in the same manner, as shown in FIGS. 7a and 8a, i.e., either both to the sides of links 4 and 3 or both to the tops of links 4 and 3.

It is clear that angle $\beta$ may also be varied otherwise, for example, by bending the bars in the vicinity of the chains, so that each bar has a horizontal centre portion which through S- of Z-shaped end portions is connected to the chain links.

I claim:

1. A conveyor, in particular for eggs, comprising a conveyor belt composed of bars of spring steel or like material, which bars extend transversely to the conveyor belt and have their end portions secured to chains of the type having closed annular links extending in perpendicular planes, which links, for traversing bends, permit temporary shortening of the chain by sliding one into to the other, characterized in that the successive bars in the belt are disposed at different levels relative to the plane of transportation.

2. A conveyor as claimed in claim 1, wherein the difference in level between successive bars is obtained by an effective choice of the attachment of a bar to the chain links.

3. A conveyor as claimed in claim 1, wherein the bar ends are secured, for example by welding, to the tops of the vertical links and to the sides of the horizontal links.

4. A conveyor as claimed in claim 1, wherein the bar ends are secured to the side of the vertical links and to the top of the horizontal links.

5. A conveyor as claimed in claim 1, wherein the chains run in a guiding chute, and further comprising driven sprockets arranged for engagement with the chains.

* * * * *